(12) United States Patent
Murai

(10) Patent No.: US 6,351,818 B1
(45) Date of Patent: Feb. 26, 2002

(54) EXTERNAL INTERFACE CIRCUIT

(75) Inventor: Nobuhiro Murai, Sizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/264,443

(22) Filed: Mar. 8, 1999

(30) Foreign Application Priority Data

Mar. 11, 1998 (JP) .......................................... 10-058727

(51) Int. Cl.$^7$ ................................................ G06F 1/26
(52) U.S. Cl. ...................................... 713/300; 710/129
(58) Field of Search ................................. 710/100–103, 710/129; 713/300–340

(56) References Cited

U.S. PATENT DOCUMENTS

| | | | | |
|---|---|---|---|---|
| 5,678,050 A | * | 10/1997 | Kudoh | ........................ 713/300 |
| 5,974,488 A | * | 10/1999 | Dobbins et al. | ............ 710/100 |

FOREIGN PATENT DOCUMENTS

| | | |
|---|---|---|
| JP | 55028177 | 2/1980 |
| JP | 59151550 | 8/1984 |
| JP | 57176850 | 9/1985 |
| JP | 60217425 | 10/1985 |
| JP | 3010128 | 2/1991 |
| JP | 4371133 | 12/1992 |
| JP | 6332591 | 12/1994 |
| JP | 7020970 | 1/1995 |
| JP | 9282263 | 10/1997 |

OTHER PUBLICATIONS

Office Action issued by the Japanese Patent Office on Apr. 6, 1999 in the corresponding Japanese application and an English translation of relevant portions thereof (previously submitted).

* cited by examiner

*Primary Examiner*—David Wiley
(74) *Attorney, Agent, or Firm*—Ostrolenk, Faber, Gerb & Soffen, LLP

(57) ABSTRACT

An external interface circuit in an electronic device is capable of continuing data communication between other electronic devices through the first device even when a main body power source in the first device is cut off. In a computer main body, the main body power source and an IEEE-1394 interface are provided. Two external devices having IEEE-1394 interfaces are connected through the first interface. The interface of the computer main body has a power source control portion, a link layer control portion and a physical layer control portion. In the power source control portion, a power source detecting portion and a switch are arranged. When an input of power from the main body power source is detected, a power source detecting portion of the power source control portion controls the switch so that the power from the main body power source is supplied to the physical layer control portion. When input of power from the main body power source is not detected, the power source detecting portion controls the switch for supplying power from a power source of two external devices having IEEE-1394 interfaces to the physical layer control portion of the main body.

11 Claims, 2 Drawing Sheets

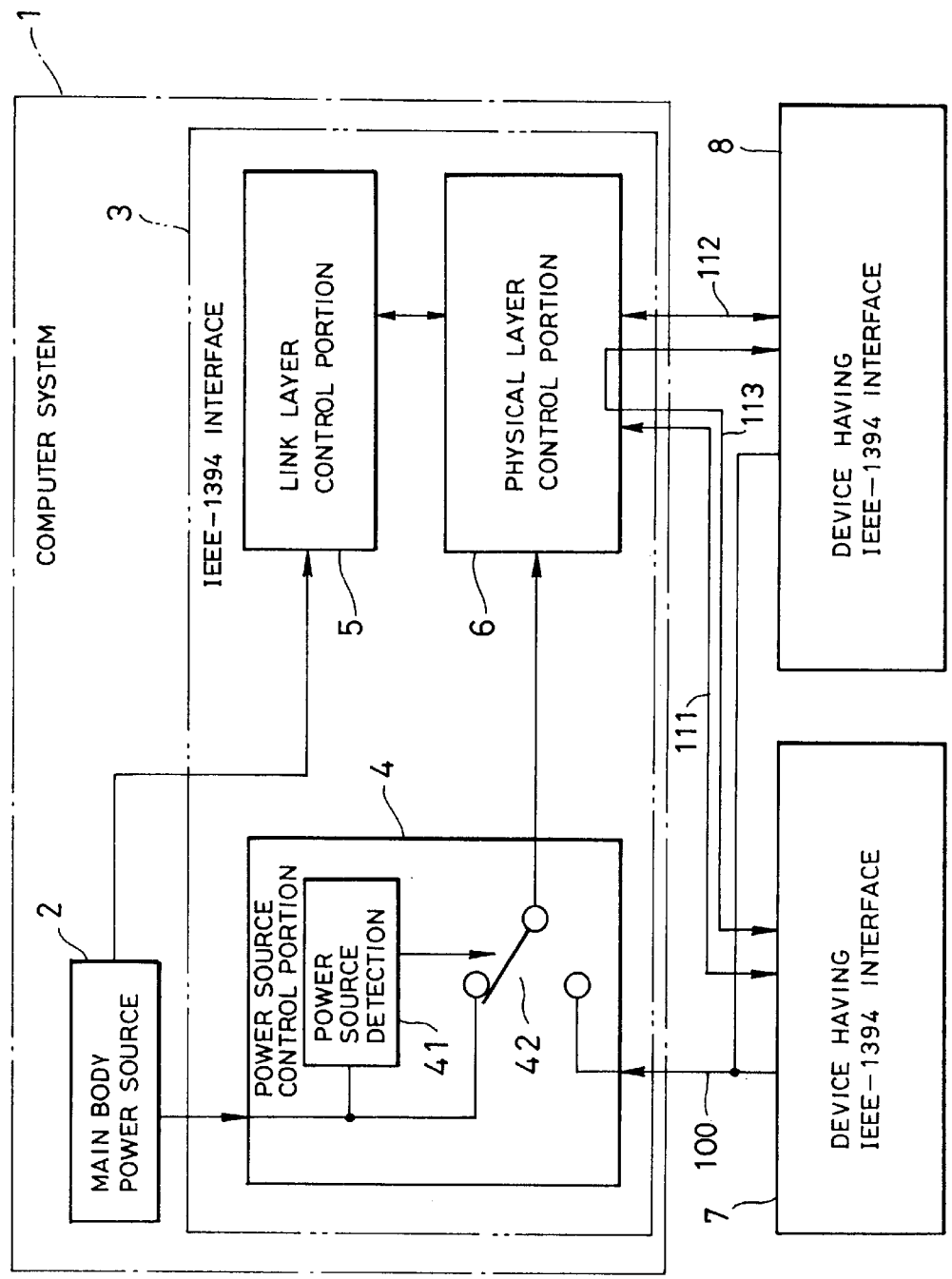

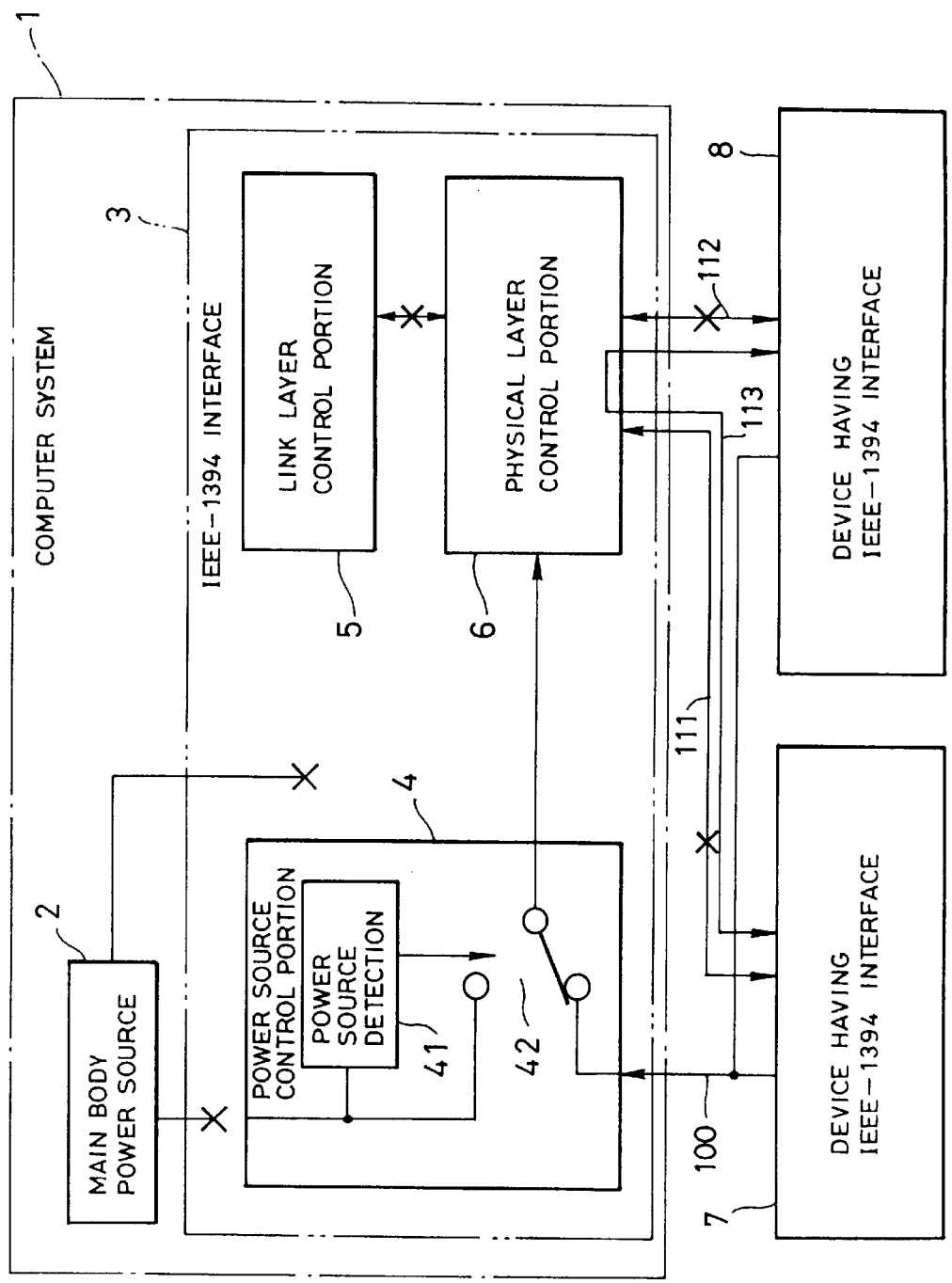

EXTERNAL INTERFACE CIRCUIT

BACKGROUND OF THE INVENTION

1. Field of the Invention

The present invention relates generally to an external interface circuit. More particularly, the invention relates to an interface circuit in accordance with IEEE-1394.

2. Description of the Related Art

Conventionally, in an interface circuit of the kind set forth above, there has been considered a system, in which a plurality of electronic devices are connected through communication control bus in accordance with IEEE-1394 standard and information signals, control signals and so forth are exchanged between the electronic devices through such communication control bus.

Transmission of signals in respective electronic devices within the system has been performed a time division multiplexing per a predetermined communication cycle. Transmission of this signal is initiated in response to transmission of a cycle start packet indicative of start timing of the communication cycle by an electronic device called as a cycle master. It should be noted that the cycle master is determined automatically according to a procedure defined in IEEE-1394 upon connection of respective electronic devices through communication control bus.

As modes of communication within one communication cycle in the system set forth above, there are two kinds of communication modes, i.e., an Isochronous (Iso) communication for an Iso transmission of information signal, such as video signal, audio signal and so forth, and Asynchronous (Async) communication for an Async transmission.

In this case, Iso packet is transmitted in advance of Async packet. The Iso packet can be distinguished from a plurality of Iso data by adding respective channel number. A period after finishing of transmission of the Iso packet to a next cycle start packet is used for transmission of the Async packets.

On the other hand, in the system set forth above, if respective electronic devices are connected by the communication control bus, node IDs (physical addresses) are assigned automatically depending upon a connection mode. The node ID is also re-assigned automatically depending upon new connection mode when new electronic device is added to the system or the electronic device is removed from the system. The communication control bus in accordance with IEEE-1394 has been disclosed in Japanese Unexamined Patent Publication No. Heisei 9-282263.

In the electronic device having the interface circuit in accordance with IEEE-1394 set forth above, a control portion for performing data communication between other electronic devices connected by a daisy chain through the interface circuit, through own device, is driven by a power source of a main body.

A specification of the interface in accordance with IEEE-1394 has been standardized as IEEE-1394-1995. Therefore, detailed description of the specification is neglected from the disclosure.

In the electronic device having the interface in accordance with IEEE-1394, since the control portion for performing data communication between other electronic devices through own device, is driven by the power source of the main body, the power source of the control portion is turned OFF when the power source of the main body is turned OFF.

Therefore, if data communication between other electronic devices connected to the own device through the daisy chain through the own device, the communication is shut off.

SUMMARY OF THE INVENTION

The present invention has been worked out for solving the problem in the prior art set forth above. It is therefore an object of the present invention to provide an external interface circuit which permits data communication even when a power source of a main body is cut off while data communication between other electronic devices is performed through own device.

According to the first aspect of the present invention, an external interface circuit comprises:

a control portion performing data communication between other electronic devices connected with an own device through a communication control bus; and power source control means for switching a power supply from the own device to a power source of the other electronic device when the power supply of the own device to the control portion is cut off.

According to the second aspect of the present invention, an external interface circuit provided in an own device and establishing a daisy chain connection between the own device and other electronic devices through a communication control bus, comprises:

control portion incorporated in the external interface circuit for performing data communication between the other electronic devices through the own device; and power source control means for switching a power supply from the own device to a power source of the other electronic device when the power supply of the own device to the control portion is cut off.

In the construction set forth above, the power source control means may comprise detecting means for detecting cutting off of power supply to the control portion from the own device, switching means for switching between a power supply to the control portion from the own device and a power supply to the control portion from the other electronic devices, and means for controlling switching operation of power supply by the switching means depending upon a result of detection by the detecting means.

The control portion may be constructed for modulating data to be transmitted between the other electronic devices into data according to a preliminarily set interface standard. The communication control bus may be constructed in accordance with IEEE-1394.

The external interface circuit may further comprise an interface control portion controlling the control portion, and the power source is also supplied to the interface control portion.

If the power source supplied to the interface control portion is cut off, at least data communication between the own device and other electronic device may be cut off on the other hand, if power source is supplied to the control portion, at least data communication between a first other electronic device and a second other electronic device can be continued through the control portion.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 1 is a block diagram showing a system construction of a computer system having the preferred embodiment of an external interface circuit according to the present invention; and FIG. 2 is a block diagram showing a connecting condition of respective parts upon turning OFF of a power source of a main body of FIG. 1.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

FIG. 1 is a block diagram showing a system construction of a computer system having the preferred embodiment of an external interface circuit according to the present invention. In FIG. 1, a main body power source 2 and an IEEE-1394 interface 3 (hereinafter referred to as "interface") are provided in a computer system 1. Through the interface 3, devices having IEEE-1394 interface (not shown), which devices 7 and 8 will be hereinafter referred to as "external devices", are connected. It should be noted that while not illustrated, CPU (central processing unit), ROM (read-only-memory), RAM (random-access-memory) and so forth are also provided in the computer system 1.

The interface 3 has a power source control portion 4, a link layer control portion 5, a physical layer control portion 6. In the power source control portion 4, a power source detecting portion 41 and a switch 42 are provided.

A daisy chain connection is established between the interface 3 and the external devices 7 and 8. Namely, connection is established in a sequential order of external device 7→interface 3→external device 8. In the connection established between the external devices 7 and 8 and the interface 3 as set forth above, data communication is performed between the interface 3 and the external device 7 through a signal line 111. Also, data communication is performed between the interface 3 and the external device 8 through a signal line 112. Furthermore, data communication between the external devices 7 and 8 is performed through a signal line 113.

The link layer control portion 5 serves for controlling the physical layer control portion 6. On the other hand, the physical layer control portion 6 serves for modulating data into a data of IEEE-1394 interface standard. The power source control portion 4 supplies the main body power source 2 to the physical layer control portion 6 when inputting of the main body power source 2 is detected by a power source detecting portion 41. On the other hand, if inputting of the main body power source 2 is not detected, the power source control portion 4 serves for supplying a power source from the external devices 7 and 8.

FIG. 2 is a block diagram showing connecting condition of respective parts when the main body power source is turned OFF. A power supply operation of the preferred embodiment of the computer system according to the present invention will be discussed with reference to FIGS. 1 and 2.

At first, as shown in FIG. 1, while the main body power source 2 is turned ON, the link layer control portion 5 is driven by the main body power source 2. On the other hand, since the power source detecting portion 41 of the power source control portion 4 detects inputting of the main body power source 2, the switch 42 is controlled so that the main body power source 2 is supplied to the physical layer control portion 6.

Therefore, in the interface 3, data communication can be performed between the external devices 7 and 8 through the IEEE-1394 6 and signal lines 111 and 112. On the other hand, it is also possible to perform data communication between the external devices 7 and 8 through a signal line 113 in certain specification of the interface 3.

On the other hand, as shown in FIG. 2, when the main body power source 2 is turned OFF, the link layer control portion 5 is not driven. However, if inputting of the main body power source is not detected by the power source detecting portion 41, the switch 42 is controlled so that the power source of any one of the external devices 7 and 8 connected to the interface 3 is supplied to the physical layer control portion 6.

Therefore, in the interface 3, data communication between the external devices 7 and 8 is cut off. However, data communication between the external devices 7 and 8 by the signal line 113 can be continued without being cutting off.

It should be noted that while the foregoing discussion has been given for the embodiment, in which the power source control portion 4, the link layer control portion 5 and the physical layer control portion 6 are arranged only in the interface 3, it is possible to construct the IEEE-1394 interfaces arranged in the external devices 7 and 8 with the same construction as the interface 3. In this case, when the computer system 1 is not provided between the external devices 7 and 8, the preferred embodiment of the present invention is applicable.

Thus, since the power source control portion 4 switches between the main body power source 2 and a power source from the external devices 7 and 8 connected to the interface 3 depending upon supply condition of the main body power source 2 detected by the power source detecting portion 41, driving of the IEEE-1394 can be continued so that data communication between the external devices 7 and 8 can be continued through the interface 3 without causing cutting off.

As set forth above, according to the present invention, in the external interface circuit including the control portion for performing data communication between other electronic devices connected to the own device through the communication control bus, even when the power source supplied from the own device to the control circuit is cut off, switching is effected to supply the power source of other electronic device to the control circuit so that data communication between other electronic devices can be continued through the own device.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. An external interface circuit in a first electronic device, comprising:

a control portion which performs data communication between the first electronic device and other electronic devices connected with the first device through a communication control bus; and a power source control for switching a power supply of said first device to a power source of one of said other electronic devices when the power supply of said first device to said control portion is cut off, so that data communication between the other electronic devices can be sustained while passing through said control portion of said first device via said communication control bus.

2. An external interface circuit as set forth in claim 1, wherein said power source control comprises:

a detector for detecting a cutting off of the power supply to said control portion of said first device;

a switch for switching between a power supply to said control portion of said first device and a power supply to said control portion of one of said other electronic devices; and means for controlling the switching of the power supply by said switch depending upon a result of detection by said detector.

3. An external interface circuit as set forth in claim 1, wherein said control portion is constructed for modulating data to be transmitted between said other electronic devices into data according to a preliminarily set interface standard.

4. An external interface circuit as set forth in claim 1, wherein said communication control bus is constructed in accordance with IEEE-1394.

5. An external interface circuit provided in a first device and establishing a daisy chain connection between said first device and other electronic devices through a communication control bus, comprising:

a control portion incorporated in said external interface circuit for performing data communication between said other electronic devices through said first device; and a power source control for switching a power supply of said first device to a power source of one of said other electronic devices when the power supply of said first device to said control portion is cut off, so that data communication between the other electronic devices can be sustained while passing through said control portion of said first device via said communication control bus.

6. An external interface circuit as set forth in claim 5, wherein said power source control comprises:

a detector for detecting a cutting off of the power supply to said control portion of said first device;

a switch for switching between a power supply to said control portion of said first device and a power supply to said control portion of one of said other electronic devices; and means for controlling the switching of the power supply by said switch depending upon a result of detection by said detector.

7. An external interface circuit as set forth in claim 5, wherein said control portion is constructed for modulating data to be transmitted between said other electronic devices into data according to a preliminarily set interface standard.

8. An external interface circuit as set forth in claim 5, wherein said communication control bus is constructed in accordance with IEEE-1394.

9. An external interface circuit as set forth in claim 5, which further comprises an interface control portion controlling said control portion, and said power source is also supplied to said interface control portion.

10. An external interface circuit as set forth in claim 9, wherein if power from said power source and supplied to said interface control portion is cut off, at least data communication between said first device and one of the other electronic devices is cut off.

11. An external interface circuit as set forth in claim 10, wherein if power from any other power source is supplied to said control portion, data communication between a second device from among the other devices and a third device from among the other electronic devices can be continued through said control portion.

* * * * *